United States Patent
Debouk et al.

(10) Patent No.: US 9,244,460 B2
(45) Date of Patent: Jan. 26, 2016

(54) METHODS AND APPARATUS FOR ISOLATING SAFETY FUNCTIONS IN A MOTION CONTROL SYSTEM FOR A VEHICLE

(71) Applicant: GM GLOBAL TECHNOLOGY OPERATIONS LLC, Detroit, MI (US)

(72) Inventors: Rami I. Debouk, Dearborn, MI (US); Thomas E. Fuhrman, Shelby Township, MI (US); Stephen M. Baker, Oxford, MI (US); Kevin M. O'Dea, Ann Arbor, MI (US); Jeffrey Joyce, North Vancouver (CA)

(73) Assignee: GM Global Technology Operations LLC, Detroit, MI (US)

( * ) Notice: Subject to any disclaimer, the term of this patent is extended or adjusted under 35 U.S.C. 154(b) by 67 days.

(21) Appl. No.: 14/144,987

(22) Filed: Dec. 31, 2013

(65) Prior Publication Data

US 2015/0185732 A1    Jul. 2, 2015

(51) Int. Cl.
  *B05D 1/00* (2006.01)
  *B60W 50/02* (2012.01)
  *B60W 50/04* (2006.01)
  (Continued)

(52) U.S. Cl.
  CPC ............ *G05D 1/0055* (2013.01); *B60W 50/02* (2013.01); *B60W 50/045* (2013.01); *G05D 2201/0213* (2013.01)

(58) Field of Classification Search
  CPC ..... G05D 1/0055; G05D 1/021; B60W 10/02; B60W 50/045
  USPC .......... 701/23, 43, 39; 180/6.2, 272; 340/576, 340/573.1
  See application file for complete search history.

(56) References Cited

U.S. PATENT DOCUMENTS

| | | |
|---|---|---|
| 8,648,728 B2 * | 2/2014 | Comeau ................. 340/576 |
| 2011/0209929 A1 * | 9/2011 | Heinzmann et al. .......... 180/6.2 |

FOREIGN PATENT DOCUMENTS

KR    2013139608 A  * 12/2013

OTHER PUBLICATIONS

Antonio Casimiro, Jorg Kaiser, Elad M. Schiller, Pedro Costa; The KARYON Project: Predictable and Safe Coordination in Cooperative Vehicular Systems; Jun. 24-27, 2013; pp. 1-12.*

(Continued)

*Primary Examiner* — Marthe Marc-Coleman
(74) *Attorney, Agent, or Firm* — Mickki D. Murray, Esq.; Parks Wood LLC (57) ABSTRACT

The present disclosure relates to an automated system for use in connection with longitudinal deceleration, longitudinal acceleration, and lateral acceleration functions. The system includes an interface receiving signals from and transmitting signals to a controller. The system also includes a safety kernel system comprising safety kernel software and a set of safety rules. Also disclosed are methods for use in a motion control system in connection with vehicle deceleration, acceleration, and lateral acceleration. The methods in some cases include receiving an initial request into a safety kernel software and determining whether the safety kernel software has received an override. The methods can also include detecting a violation of any primary safeguards defined by the safety kernel software, detecting a violation within a set of secondary safeguards defined by the safety kernel software, and adjusting the initial request to a modified level; and transmitting the modified level to an actuator.

20 Claims, 5 Drawing Sheets

(51) Int. Cl.
*G05D 1/02* (2006.01)
*G05D 1/00* (2006.01)

(56) References Cited

OTHER PUBLICATIONS

Antonia Casimiro, Jorg Kaiser, Johan Karlsson, Elad Michael Schiller, Philippas Tsigas, Pedro Costa, Jose Parizi, Rolf Johansson, Renato Librino; 2012; Brief Announcement: KARYON: Towards Safety Kernels for Cooperative Vehicular Systems; pp. 232-235.*

Pedro Nobrega Da Costa, Joao Craveiro, Antonio Casimiro, Jose Rufino; Safety Kernel for Cooperative Sensor-Based Systems; Oct. 2013; pp. 1-13.*

Casimiro, A.; Kaiser, J; Schiller, E.M.; Costa, P; The KARYON project: Predictable and safe coordination in cooperative vehicular systems; Jun. 2013; pp. 1-2.*

\* cited by examiner

METHODS AND APPARATUS FOR ISOLATING SAFETY FUNCTIONS IN A MOTION CONTROL SYSTEM FOR A VEHICLE

TECHNICAL FIELD

The present technology relates to software architecture including safety kernel software that facilitates implementation and verification of safety-critical application software. More specifically, the technology relates to safety kernel software for use in association with autonomous vehicle acceleration, deceleration, and steering functions.

BACKGROUND

A safety kernel provides assurance that a set of required fundamental properties of a control function hold at all times during execution of safety-critical software. These properties are specified as safety rules.

Safety kernels have been used successfully to protect access to computing resources. They have also been used, in security applications, to prevent unauthorized information flow. Safety kernels, also called safety interlocks, have been successful in enforcing security and safety in areas including traffic light control, rail signaling, and nuclear energy generation.

A safety kernel can be viewed as a layer of software configured to, under one or more conditions, intervene in operation of the software. For example, in vehicular applications, a safety kernel can intervene if a vehicle function request violates one or more safety rules set by the software. The safety kernel serves as a layer of protection capable of controlling certain aspects of vehicle hazards. The safety kernel can also perform specific portions of the analysis of Safety Integrity Level (SIL) data associated with elements of the application software of the vehicle.

SUMMARY

Given the aforementioned issues, a need exists for an independent safety kernel program to be implemented in vehicles having autonomous control functions. The safety kernel and associated safety rules operate independently of application software associated with autonomous vehicle control functions.

The present disclosure relates to systems and methods for implementing a safety kernel that monitors input data associated with longitudinal deceleration (e.g., braking), longitudinal acceleration (e.g., pressing the throttle), and lateral acceleration (e.g., steering). When an initial request relating to a potential safety violation is transmitted, by the application software, to the safety kernel software for analysis, the safety kernel software will analyze the initial request and either (1) allow the initial request, in response to determining that the initial request is within a safe-state acceptable value, to pass to one or more appropriate vehicle actuators (e.g., steering actuator), (2) limit the initial request to a safe-state acceptable value prior to allowing the request to pass to the actuator(s) in response to determining that the initial request has not met the parameters of the safety program, or (3) block the initial request. Blocking the initial request under the third operation (3) could include, e.g., not forward or otherwise allow the request to pass to the actuator(s), in response to determining that the initial request violates an implemented safety kernel software safeguard. In one embodiment, the blocking option includes the safety kernel software determining to not take further action regarding the initial request, thereby keeping the initial request from passing to any vehicle actuator.

In the present technology, the safety kernel software applies a safety rule, or a set of safety rules, to received requests, for braking, propulsion, and steering actuator actions.

The safety kernel software serves as a layer of protection capable of controlling certain aspects of one or more vehicle operations to address potential problems, such as Automated Driving System (ADS) and Collision Mitigation System (CMS) hazards. The safety kernel software integrates with the ADS software and evaluates data received from a set of measuring devices according to the safety rules. The measuring devices transmit data pertaining to motion control actuation, e.g., deceleration, forward acceleration, and lateral acceleration. All requests, such as relating to braking, propulsion, and/or steering, are submitted to the safety kernel for evaluation.

As noted, in the present technology, the safety kernel software is independent of the safety-critical application software. Isolation of the safety rules and the safety kernel software from the application software limits opportunities for the application software to interfere with the application of the safety rules. In some embodiments, the safety kernel software is configured to implement protocols that detect potential flaws or errors within the application software.

In one aspect, the present technology includes a safety kernel system for use in connection with vehicle functions including controlling longitudinal deceleration (or, just, deceleration), longitudinal acceleration (or, just, acceleration), and lateral acceleration of a vehicle. The safety kernel system includes, among other features, safety kernel software and a set of safety rules. The safety kernel system receives, from an application software, requests for safety-critical functions related to vehicle motion. The safety kernel system is directed by a controller that receives input from and provides output to an interface. The interface is configured to receive signals from and transmit signals to the safety kernel system. The safety kernel system also receives data transmitted by a measurement system, which includes data originating from environmental inputs (e.g.,) as well as originating derived from system operator inputs.

In another aspect, the present technology includes methods, for use in connection with vehicle deceleration, acceleration, and lateral acceleration functions. In certain embodiments, the application software transmits an initial request to the safety kernel software. The safety kernel software then determines whether an override has been received, detects if a violation of any primary safeguards exists, detects if a violation of any secondary safeguards, limits the initial request to a modified level, and transmits the modified level to an actuator.

In certain embodiments, operations associated with the primary safeguard violations include detecting any failure within a set of measuring devices of a measurement system and verifying that the initial request was transmitted by the application software package. In some embodiments, the request received by the safety kernel software package is blocked if primary safeguard violations exist.

In certain embodiments, operations associated with the secondary safeguard violations include evaluating if the application software has generated an increase in acceleration request based on a most recent command state, evaluating whether the application software has generated a hard brake request, and evaluating whether the vehicle is in a vicinity of a threat.

In some embodiments, the request received by the safety kernel software package is blocked from being passed to the braking actuator if secondary safeguard violations exist.

In some embodiments, the request received by the safety kernel software package is adjusted to a modified level of deceleration prior to transmitting the modified level to the braking actuator. The request is adjusted to a modified level of deceleration when the application software has generated a hard brake request or the vehicle is in the vicinity of the threat.

In certain embodiments, operations associated with the secondary safeguard violations include evaluating whether the application software has generated a deceleration request based on the previous state data, and the safety rules compare the vehicle speed to a threshold speed.

In some embodiments, the request received by the safety kernel software package is blocked from being passed to the propulsion actuator if the secondary safeguard violations exist.

In some embodiments, the request received by the safety kernel software package is adjusted to a modified level of acceleration prior to transmitting the modified level to the propulsion actuator. The request is adjusted to a modified level of acceleration when the request is greater than the threshold speed.

In yet other embodiments, operations associated with the secondary safeguard violations include evaluating whether the application software has generated at least one other blocked request based on the previous state data, and the safety rules compare the vehicle speed to a threshold speed.

In some embodiments, the request received by the safety kernel software package is blocked from being passed to the steering actuator if secondary safeguard violations exist.

In some embodiments, the request received by the safety kernel software package is adjusted to a modified level of acceleration prior to transmitting the modified level to the propulsion actuator. The request is adjusted to a modified level of acceleration when the request is greater than the threshold speed.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

While the present technology is described primarily in connection with a vehicle in the form of an automobile, it is contemplated that the technology can be implemented in connection with other vehicles, such as marine craft and air craft.

I. OVERVIEW OF THE DISCLOSURE

Figure 1:
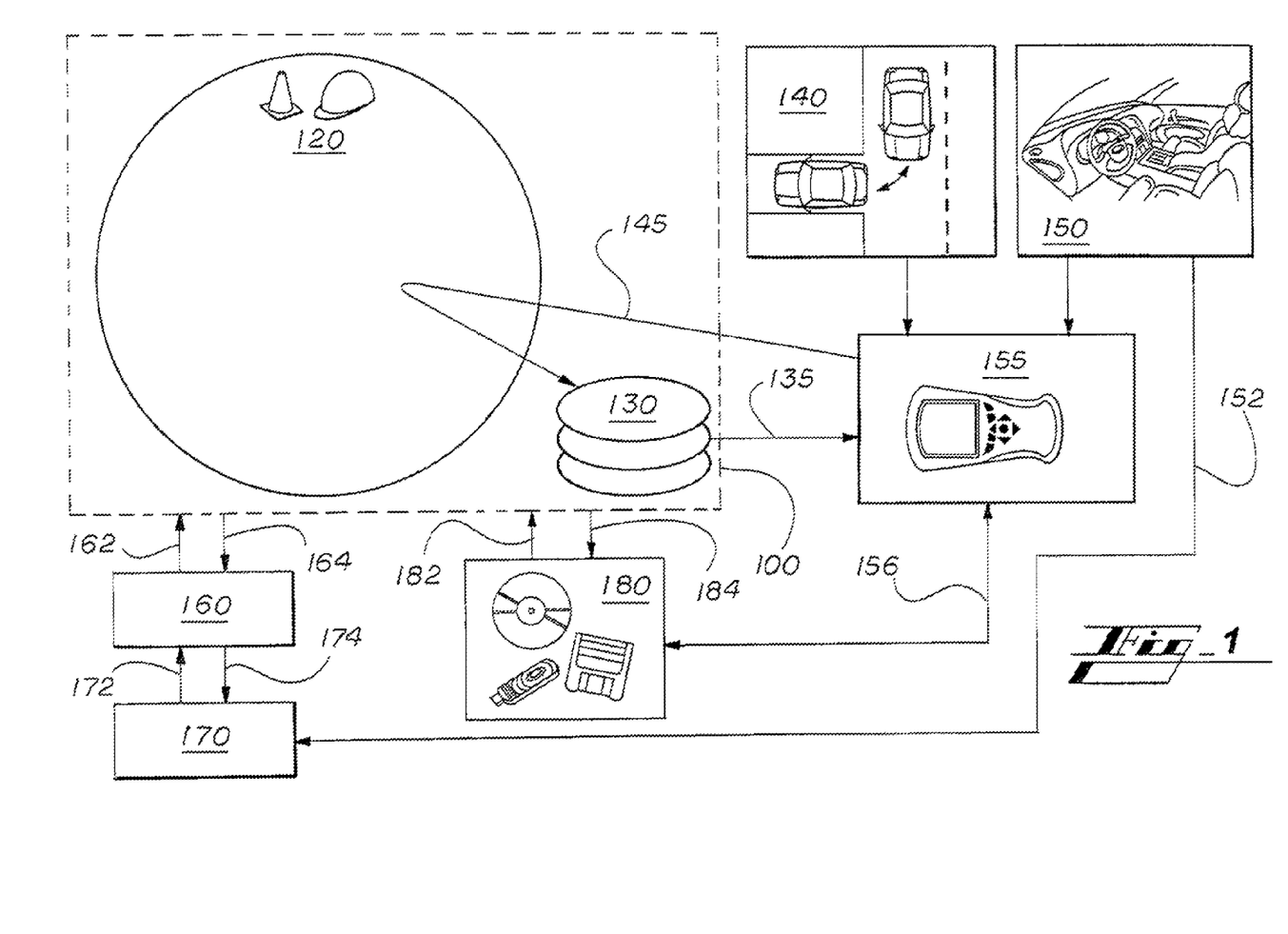
FIG. 1 illustrates an environment for implementing a safety kernel in accordance with an exemplary embodiment.

FIG. 1

Now turning to the figures, and more particularly the first figure, FIG. 1 shows a safety kernel system 100 including safety kernel software 120. The software 120 is configured to, when executed by a processor, perform safety functions associated with automated driving. The safety kernel system 100 is configured to receive, from an interface 160, input affecting certain operations of the safety kernel system 100.

The interface 160 is software that engages the safety kernel system 100 to communicate with a peripheral device, e.g., a controller 170. The interface 160 provides, via an input signal 162, an initial request to the safety kernel system 100 to run the safety kernel software 120. The interface may also receive information from the safety kernel system 100 via output signal 164.

In some embodiments, it may be desirable for the interface 160 to exchange signals with a controller 170, via an input signal 172 and an output signal 174. The controller 170 may also receive information through a signal 152 from a set of operator inputs 160, such as an acceleration request, a deceleration request, or steering angle adjustment, which alters lateral acceleration of the vehicle.

The controller 170 may be a microcontroller, microprocessor, programmable logic controller (PLC), complex programmable logic device (CPLD), field-programmable gate array (FPGA), or the like. The controller may be developed through use of code libraries, static analysis tools, software, hardware, firmware, or the like. Any use of hardware or firmware includes a degree of flexibility and high-performance available from an FPGA, combining the benefits of single-purpose and general-purpose systems. It will be apparent to a person skilled in the relevant art how the present technology can be implemented using one or more other computer systems and/or computer architectures.

Safety kernel software 120 operation includes application of the set of safety rules 130. Data relating to a set of environmental inputs 140 and the operator inputs 150 are gathered using a measurement system 155 and then transmitted to the safety kernel system 100. The measurement system 155 transmits the gathered data, via an action signal 145, to the safety kernel software 120. The safety rules 130 are applied using the gathered data received by the signal 145. Once the safety rules 130 are applied to the gathered data, the safety kernel system 100 determines a suitable response based on the gathered data. The response is communicated from the safety kernel system 100 to the measurement system 155 for implementation via a status signal 136. The status signal 135 may be generated from the components of the safety kernel system, including the safety kernel software 120, the safety rules 130, or a combination thereof.

The transmission of data for both the status signal 135 and the actions signal 145 can also be set to run at automatic intervals. For example, data transmission may occur every 30 milliseconds in normal weather conditions, e.g., when tire traction with the road is within a normal range, but the interval may be set to five milliseconds for special weather conditions, such as rain or snow, when tire traction with the road is reduced. Additionally, the transmission of data can be set to run at the occurrence of specific events. For example, data transmission may only occur when the car is receiving power, i.e., the car is idling or moving.

The safety kernel software 120 is a robust software program. For example, the safety kernel software 120 may include processing components (not shown in detail) such as a perception layer to observe and/or document the qualities and characteristics of vehicle surroundings for relevant incoming raw data; a decision layer to interpret the raw data and derive a set of actions; an action layer for implementing the actions derived by the decision layer, or any combination thereof. The safety kernel software 120 may also include additional lower level layers for support and other operational functionality such as monitoring or recording layers.

Conceptually, the safety kernel software 120 is a "thin" layer of software that intervenes if a request for acceleration, deceleration, or steering violates one or more of the safety rules 130. It is also possible that a portion of the safety kernel software 120 could be implemented by the controller 170, i.e., at a position near an actuator.

The requests by the ADS and the CMS for deceleration, acceleration, and lateral acceleration may pass through the safety kernel software 120, i.e., the safety kernel may actively decide whether to allow each such request to pass through to the actuator.

For example, when the CMS is activated (i.e., starts generating requests for deceleration, acceleration, and lateral acceleration), the ADS may become disengaged and remain disengaged until a human interface (e.g., the vehicle operator or passenger) takes action to re-engage the ADS, i.e., all the ADS requests following activation of the CMS may be blocked by the safety kernel software 120.

The safety kernel software 120 does not attempt to emulate or predicate the state of the ADS or the CMS. Rather the safety kernel software 120 may monitor when the ADS begins to control longitudinal motion and lateral motion, i.e., the ADS begins sending deceleration, acceleration, and lateral acceleration requests.

The safety rules 130 are specified within the safety kernel system 100 and may be stored within or transmitted to the safety kernel software 120. The safety rules 130 are applied to the gathered data received into the safety kernel system 100 by using constant-state safety kernel system 100 information, such as an acceptable state transition or a maximum value for a parameter.

The safety rules 130 may be any set of commands to create a response by the safety kernel software 120. The commands may include information gathered from the environmental inputs 140 and the operator inputs 150. The data gathered from environmental inputs 140 and the operator inputs 150 and transmitted through the measurement system 155 are used as data to which the safety rules 130 are applied to create the suitable response within the safety kernel software 120. Once the safety rules 130 are applied to the gathered data, the safety kernel system 100 determines a suitable response based on the gathered data.

The safety rules 130 may include action commands such as braking for deceleration, propulsion for acceleration, or steering for vehicle lateral acceleration. The safety rules 130 may also include non-action commands. For example, the safety kernel rules 130 may instruct safety kernel software 120 to not forward or otherwise allow a request to pass to one or more appropriate actuators in response to a request of increased acceleration when the safety kernel software operator has input an override. Further details associated with safety rules are discussed in association with FIGS. 2-5.

The measurement system 155 transmits signals associated with the environmental inputs 140 and the operator inputs 150. The measurement system 155 translates the data from the environmental inputs 140 and the operator inputs 150 through the actions signal 145 to the safety kernel software 120.

The measuring devices can be any device that is designed to receive information and are positioned at locations suitable to receive transmission data. The devices can be located to measure road conditions, weather conditions, and visibility, among others. The measurement system 155 can receive data from one or more measuring devices working together or independently. Wherever possible, if multiple measuring devices are in use, the measuring devices should be independent of each other, such that the failure of one measuring device does not affect any other measuring device. Measurements can be taken from the measuring devices at a certain interval of time, i.e., a cycle time, which can be altered or variable based on specific application needs; however, typical time cycles can be between two and 100 milliseconds.

The measuring devices can be input devices, i.e., sensors such as vehicle speed sensors, to measure the speed of the vehicle; speed sensors to measure the speed of an object approaching or near the vehicle; proximity sensors such as parking sensors that alert of unseen obstacles during parking maneuvers; or the like. The function of the sensors are to monitor variable data from both internal and external vehicle sources such as pressure and temperature, convert the variable data into a signal, and transmit the variable data to be read by an indicator, i.e., the measurement system 155. Measuring devices may also be output devices, e.g., actuators such as hydraulic actuators to facilitate mechanical operation of a vehicle system, pneumatic actuators to operate a vehicle's linear positioning, electric actuators to power mechanical torque, mechanical actuators to execute movement of vehicle device, or a combination thereof. The function of the actuators is to realign received data in accordance with the signal transmitted to a transducer. More specifically, the actuators convert an energy source into motion (i.e., a specific response) to be applied by the vehicle. The input data received into the measurement system 155 can include primary data such as propulsion velocity, linear position, brake force, and the like. The input data may also include past data, such as historical data, and/or any trends or related data that can be derived there from.

The measurement system 155 may include a processor, which sends the actions signal 145 to the safety kernel software 120. The data obtained by the measuring devices can also be a computer readable code disposed in any known computer usable medium similar to those described in association with the library repository 180, described below.

The data generated from the safety kernel system 100, including the safety kernel software 120, and/or the safety rules 130 may optionally be stored to a library repository 180 by transmitting an input signal 182.

The library repository 180 may also transmit the stored data back to the safety kernel system 100 via an output signal 184. Additionally, the library repository 180 may receive information transmitted by the measurement system 155, i.e., data inputs from the environmental inputs 140 and/or the operator inputs 150 via a signal 156. Finally, the library repository 180 may be used to facilitate reuse of certified code fragments that might be applicable to a range of applications internal and external to the safety kernel system 100.

The data stored within library repository 180 may be transmitted as a computer readable code disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium).

As understood by one in the art, the safety kernel system 100 can include one or more other devices and components within the safety kernel system 100 or in support of the safety kernel system 100. For example, the interface 160 may receive data transmission from multiple controllers. Additionally, multiple interfaces may be required for executing distinct vehicle functions such as acceleration and deceleration.

II. METHODS OF OPERATION

FIGS. 2-5

FIGS. 2-5 show an example method 200 and related methods 300, 400, 500, thereof, according to embodiments of the present disclosure. It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

II.A. Process Overview

Figure 2:
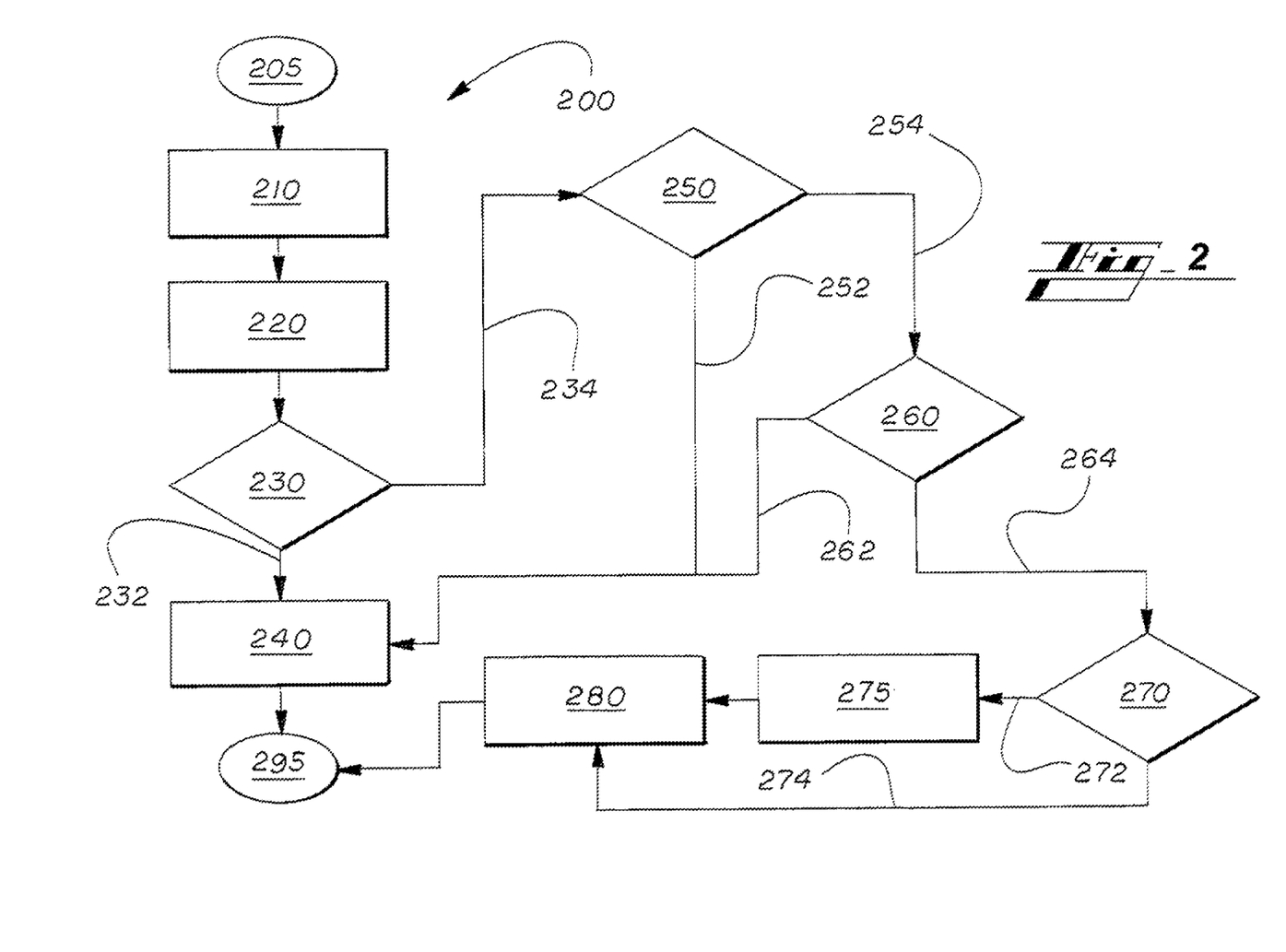
FIG. 2 is a flow chart illustrating methods for performing functions of the safety kernel in accordance with an exemplary embodiment.

FIG. 2

Many of the actuator control policies are enforced at about the time an initial request for deceleration, acceleration, or lateral acceleration is received from the ADS and the CMS. The initial request triggers commencement of a state-action process 200 depicted in as a flow chart in FIG. 2. The transitions from one state to the next state are recorded along with conditions that must be satisfied for a request from the ADS and the CMS to be granted. The states are the command states that result from action requests. Other elements of the state that might change without a direct action request are a part of the operational state of the device. The state-action process 200 would proceed as follows.

The process begins by activating or engaging a response mode at step 205. The software may be engaged through a controller, similar to the controller 170 described in association with FIG. 1. The controller sends an "engage response mode" message through an interface, similar to the interface 160, and the interface then sends the initial request through the ADS and the CMS at step 210.

Next, the safety kernel software receives the initial request from the ADS and/or the CMS at step 220. The safety kernel software is substantially similar to the safety kernel software 120 described above. The safety kernel software at step 220, evaluates what action to take in response to the initial request received from the ADS and the CMS. The actions of safety kernel software may be transmitted from data (1) stored internal to the safety kernel software, (2) received from a measurement system, similar to the measurement system 155, or (3) stored within a library repository, similar to the library repository 180.

To evaluate what action to take in response to the initial request, the safety kernel software determines whether there is a safety kernel software override at step 230. The override can be any interaction communicated with the ADS and/or the CMS to maintain vehicle conditions, e.g. the vehicle operator chooses to maintain a specific speed through cruise control. The override can be imputed by a vehicle operator (e.g., operator inputs 150 described above), a vehicle passenger, or other person within the vehicle. Additionally, the override can be imputed from a source external to the vehicle. If a safety kernel software override is detected (e.g., path 232), the safety kernel software will block the request at step 240, e.g., the safety kernel software will not forward or otherwise allow the request to pass to one or more appropriate vehicle actuators. When no safety kernel software override exists (e.g., path 234), the safety kernel software continues to determine whether the initial request meets a set of primary safeguards at step 250.

The primary safeguards are a first set of safety policies that monitor measuring devices, i.e., sensor and actuators associated with the measurement system 155. These safety policies ensure the data received by the measuring device are consistent with the most recent command state to each measuring device, e.g., if a command state for deceleration is being transmitted, the sensors and actuators perceive a reduction in the vehicle speed. Each command state should also determine the frequency with which measuring devices should be monitored, i.e., a periodic cycle time.

The primary safeguards policies for detection of the failure of a measuring device should be specified for each of the possible command states. The safety policies determine the expected state of the measuring device based on the present command state of the measuring device and the time the state was entered.

The primary safeguards also dictate how a predicted state of a measuring device should be compared to the actual state of the measuring, device. The comparison of the predicted state to the actual state helps to detect possible measuring device failures and designate an appropriate error response. The safety kernel software 120 may execute any parameterized code fragment, in response to an error response. Code that is executed within the safety kernel software 120 should be verified by instituted safeguards.

Detected measuring device failures can be based on present data and/or historical data. Present, or recent vehicle-movement-related data, includes, but is not limited to, cruise control speed, acceleration, deceleration, and data received from vehicles that are in or recently passed the focus area. Historical vehicle-movement-related data includes, but is not limited to, historical cruise control, speed, acceleration, and/or deceleration of vehicles in the area.

Primary Safeguards may also include verification of the application software, including support of any software mistakes with the application software. Since the application software contains large and complex data code, flaws or errors may remain within the software upon implementation. However, these flaws or errors in the application software do not affect the operation of the safety kernel software, since the safety kernel software operates independent from the application software. As such, the safety kernel software will actually become a supplemental check to the application software to ensure any flaws or errors do not cause inappropriate response to the ADS and/or the CMS request.

When the initial request received by the safety kernel software does not meet the safety policies dictated by the primary safeguards at step 250 (e.g., path 252), the initial request is blocked at step 240. However, when the initial request does meet the primary safeguards at step 250 (e.g., path 254), the safety kernel software then determines whether the initial request meets a set of secondary safeguards at step 260.

Secondary safeguards are a second set of safety policies established by specific safety kernel rules, similar to safety kernel rules 130 described above. The safety kernel rules establish parameters within which the safety kernel software must operate.

The secondary safeguards that are enforced by the safety kernel software are also independent of the implementation of the application software. Thus, verification of secondary safeguards involves verification of the safety kernel rules, not the application software. That is not to say that the application software, will not need to be verified, but it will not be necessary to verify it to ensure enforcement of the secondary safeguards. Verification of the safety kernel rules is focused on two areas: (1) verification of the functionality of the safety kernel software and the measuring devices, which obtain the environmental and operator input data, and (2) verification of the environmental and input data, including code fragments that specify the secondary safeguards to be enforced.

When the initial request received by the safety kernel software does not meet the safety kernel rules established by the secondary safeguards at step 260 (e.g., path 262), the request is blocked at step 240. However, when the initial request does meet the secondary safeguards at step 260 (e.g., path 264), the safety kernel software determines whether the initial request should be limited at step 270.

When the initial request should be limited (e.g., path 272), the request is restricted to a modified level at step 275. An initial request is limited at step 270 when the initial request is beyond a threshold parameter set by the specific safety kernel rules. The threshold set by the safety kernel rules are specific to the desired action, e.g. the threshold for acceleration is specific to increasing the speed of the vehicle, and thus would be different from the threshold for deceleration, which is specific to reducing the speed of the vehicle. The threshold parameters are set by the safety rules and may be stored within the safety kernel software, the application software, or a library repository, similar to the library repository 180 described above.

When the request does not exceed the threshold parameters (e.g., path 274), the initial request is not limited at step 270. In this case, the safety kernel software passes the initial request directly to the appropriate vehicle actuator(s) at step 280. The actuator implements the action requested by the ADS and the CMS, modified if necessary, by the safety kernel software. The actuator, which carries out the specific action, is similar to the actuators described in association with the measurement system 155.

Once the initial request, or a limited request, is implemented the state-action process 200 concludes the safety kernel software by disabling the response mode at step 295. Similar to the engaging response mode at step 205, the disabling response mode at step 295, may be disabled through the controller and a "disable response mode" message transmitted through the interface.

II.B. Deceleration Request

Figure 3:
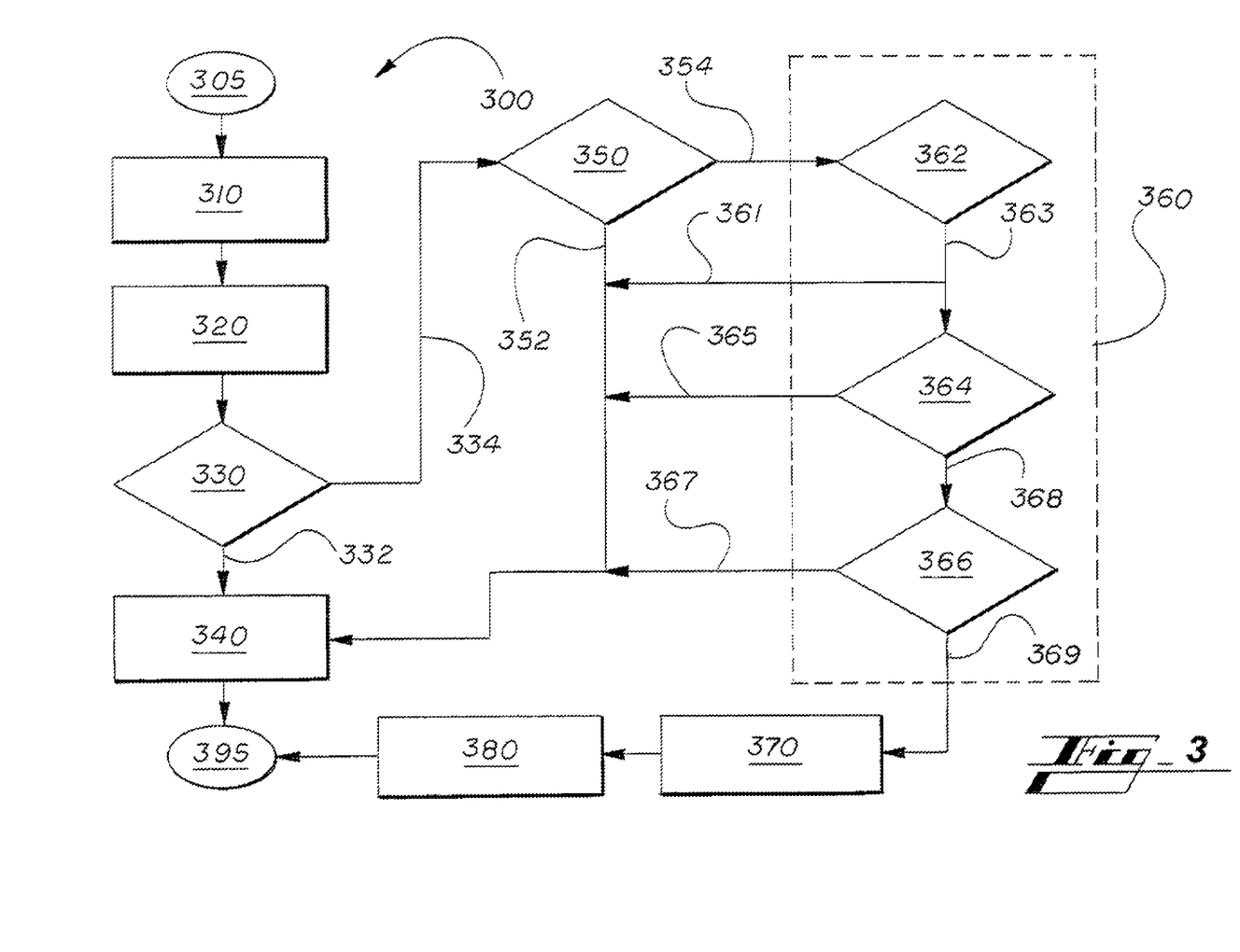
FIG. 3 is a flow chart illustrating methods associated with a deceleration safety kernel process.

FIG. 3

FIG. 3 is a flow chart illustrating certain methods associated with the deceleration safety kernel process, i.e., deceleration (longitudinal, or fore-aft deceleration) process 300. Deceleration may include actions such as braking, reducing an acceleration or speed by letting up on a throttle, downshifting from one gear to another, such as when only slight deceleration is needed, among others. fore-aft The deceleration process 300 begins similar to the general process described in action-state process 200. The process begins by engaging the response mode at step 305, and the initial request for deceleration is transmitted through the ADS and the CMS at step 310.

Next, the request from the ADS and/or the CMS enters the safety kernel software at step 320 where the safety kernel software evaluates what action to take in response to the initial request received from the ADS and/or the CMS. To evaluate the action, the safety kernel software determines if a safety kernel software override exists at step 330. When an override is detected, the safety kernel software will block the request at step 340 (e.g., path 332), and the safety kernel software will not forward or otherwise allow the request to pass to one or more braking actuators. When no override exists (e.g., path 334), the safety kernel software determines whether the initial deceleration request meets a set of primary safeguards at step 350. The primary safeguards at step 350 are similar to the primary safeguards discussed in association with FIG. 2.

When the primary safeguards are not met at step 350 (e.g., path 362), the safety kernel software blocks the initial deceleration request at step 340, and the vehicle continues with the parameters present prior to the initial request. When the primary safeguards are met at step 350 (e.g., path 354), the safety kernel software determines whether the initial request meets a set of secondary safeguards at step 360.

The secondary safeguards at step 360 include a series of confirmations, including a check for increased acceleration at step 362, a check for "hard braking" at step 364, and a check for threats at step 366. The execution of the secondary safeguard checks can be conducted in any order. However, each secondary safeguard should be confirmed for each request by the ADS and the CMS.

The check for increased acceleration at step 362 allows the safety kernel software to identify how an increase in propulsion would affect the action taken by the safety kernel software. When the ADS and/or the CMS transmit a request for deceleration, when in actuality, the vehicle has increased its acceleration, the inconsistency may prove that a flaw or error is present within the ADS and/or CMS. Since the safety kernel software operates independent of the application software, the check for increased acceleration is a secondary check for an existing flaws or errors within the ADS and/or CMS software. As such, when the vehicle has experienced an operator generated increase in acceleration, such as the vehicle operator pressing the throttle, at step 362 (e.g., path 361), then the safety kernel will block the request at step 340 the initial deceleration request. When no such increase in acceleration has occurred (e.g., path 363), the safety kernel software moves to the next secondary safeguard check.

Within the check for "hard braking" at step 364, the safety kernel software determines whether the amount of force requested by the ADS or the CMS for the initial deceleration request is greater than the amount of force required to brake under normal vehicle conditions. Normal vehicle conditions can include, among others, data measurements for a desired tire traction or coefficient of friction between the vehicle tire and the road or pavement, the condition and thickness of the brake pad, and the amount of force measured by the brake pedal.

The preset threshold value for braking under normal conditions and "hard braking" may be transmitted from data (1) stored internal to the safety kernel software, (2) received from a measurement system, similar to the measurement system 155, (3) stored within a library repository, similar to the library repository 180, (4) housed within a set of safety rules, similar to the safety rules 130, or a combination thereof.

A brake controller responsible for deceleration will apply a braking force while there is a stream of requests for deceleration disseminated by the safety kernel software, in accordance with safety kernel rules, from the ADS or the CMS to a set of braking actuators, or received by the controller from the operator inputs, similar to the operator inputs 150 described above. If requests are not received due to a failure in the brake controller, the application of braking force ceases. Specifically, whether the vehicle has not experienced "hard braking" at step 364 (e.g., path 365), the safety kernel will block the initial deceleration request at step 340. When no "hard braking" request has been generated by the application software (e.g., path 368), the safety kernel software moves to the next secondary safeguard check.

The check for threats at step 366 allows the safety kernel software to determine if external objects, either moving or stationary, are within a predetermined proximity of the vehicle. The proximity of the external object is reported through the sensor data received by the measurement system associated with environmental inputs, similar to the environmental inputs 140 described above.

Similar to the "hard braking" threshold, the distance for what constitutes a threat at step 366 may also be transferred from specified data stored within the safety kernel software, the measurement system, the library repository, or the safety rules. Also similar to the other secondary safeguards, when the vehicle does not have a threat at step 362 (e.g., path 367), the safety kernel lock the initial deceleration request at step 340.

If all secondary safeguards are met at step 360 (e.g., path 369), the safety kernel software will limit the initial request to a modified level of deceleration at step 370. A request is for deceleration is compared against a preset Unintended Vehicle Deceleration Metric (UVDM). When the initial request for deceleration is greater than the UVDM, the safety kernel software limits the acceleration to a value at or near the UVDM. However, when the initial request for deceleration is less than the UVDM, the safety kernel software allows the initial requested deceleration.

The modified level of deceleration is then passed to the braking actuator at step 380, where the actuator implements the modified request for deceleration. Either the passing of a deceleration request to the braking actuator at step 380 or the blocking of an initial deceleration request at step 340 concludes the deceleration process 300 at step 395.

II.C. Example Acceleration Request

Figure 4:
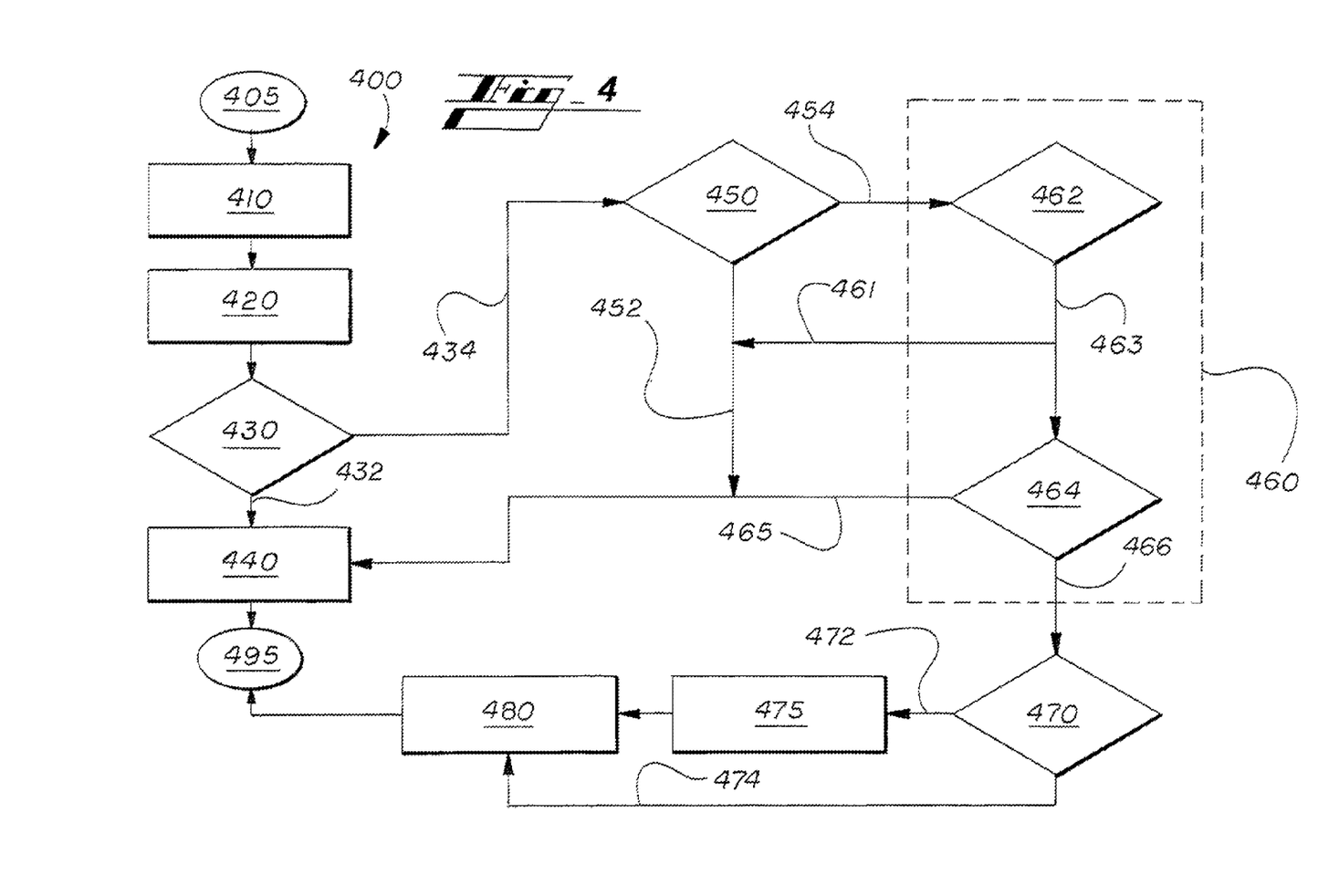
FIG. 4 is a flow chart illustrating certain methods associated with an acceleration safety kernel process.

FIG. 4

FIG. 4 is a flow chart illustrating certain methods associated with the acceleration safety kernel process, i.e., acceleration (longitudinal or fore-aft, acceleration) process 400. Acceleration may include actions such as increasing speed by pressing a throttle, up-shifting from one gear to another, such as when only slight acceleration is needed, among others.

The acceleration process 400 begins by engaging the response mode at step 406, and the initial request for acceleration is transmitted through the ADS and the CMS at step 410.

Next, the request from the ADS and/or the CMS enters the safety kernel software at step 420 where the safety kernel software evaluates what action to take in response to the initial request received from the ADS and/or the CMS. To evaluate the action, the safety kernel software determines if a safety kernel software override exists at step 430. When an override exists to control acceleration, the ADS should generate a request for propulsion. When an override is detected (e.g., path 432), the safety kernel software will block the request at step 440, e.g., the safety kernel software will not forward or otherwise allow the request to pass to one or more propulsion actuators. When no override exists (e.g., path 434), the safety kernel software determines whether the initial acceleration request meets a set of primary safeguards at step 450. The primary safeguards at step 450 are similar to the primary safeguards as discussed in association with FIG. 2.

When the primary safeguards are not met at step 450 (e.g., path 452), the safety kernel software blocks the initial acceleration request at step 440. When the initial deceleration request is blocked at step 440, the vehicle continues with the parameters present prior to the initial acceleration request. When the primary safeguards are net at step 450 (e.g., path 354), the safety kernel software determines whether the initial request meets a set of secondary safeguards at step 460.

The secondary safeguards at step 460 include a series of confirmations, including a check for braking requests at step 462, and a check, by the safety rules, to compare the vehicle speed with a threshold speed at step 464. The execution of the secondary safeguard checks can be conducted in any order. However, each secondary safeguard should be confirmed for each request by the ADS and the CMS.

The check for braking requests at step 462 allows the safety kernel software to identify possible flaws or errors with the ADS and the CMS software. When the ADS and/or the CMS transmit a request for acceleration, when in actuality, the vehicle has decelerated, the inconsistency may suggest a flaw or error is present within the ADS and/or the CMS. The separation of the safety kernel software from the application software causes the check for braking request to be a secondary check for an existing software flaw or error within the ADS and/or the CMS. As such, when the vehicle has experienced braking request at step 462 (e.g., path 461), then the safety kernel will block the request at step 440. When no braking request exists (e.g., path 463), the safety kernel software moves to the next secondary safeguard check.

The safety kernel software also compares the vehicle speed with the vehicle threshold speed at step 464. The preset vehicle speed threshold may be transferred from data (1) stored internal to the safety kernel software, (2) received from a measurement system, (3) stored within a library repository, (4) housed within a set of safety rules, or a combination thereof.

A throttle controller responsible for acceleration will apply propulsion while there is a stream of requests for acceleration disseminated by the safety kernel software, in accordance with safety rules, from the ADS or the CMS to a set of propulsion actuators, or received by the controller from the operator inputs. If acceleration requests are not being received due to a failure in the throttle controller, the propulsion reverts to its idle setting. Specifically, when the vehicle speed is less than the threshold speed at step 464 (e.g., path 465), the safety kernel will block the request at step 440.

If all secondary safeguards at step 460 are met (e.g., path 466), the safety kernel software will determine whether the initial request needs to be limited to a modified level acceleration at step 470. A request is for acceleration is compared against a preset Unintended Vehicle Acceleration Metric (UVAM). When the initial request for acceleration is greater than the UVAM (e.g., path 472), then the safety kernel software limits the acceleration to the modified level of acceleration at step 475. The modified level acceleration will be a value at or near the UVAM. When the initial request for acceleration is less than the UVAM (e.g., path 474), the safety kernel software passes the initial acceleration request to the propulsion actuator at step 480.

Either the passing of an acceleration request to the propulsion actuator at step 480 or the blocking of an initial acceleration request at step 440 concludes the acceleration process 400 at step 495.

II.D. Example Lateral Acceleration Request

Figure 5:
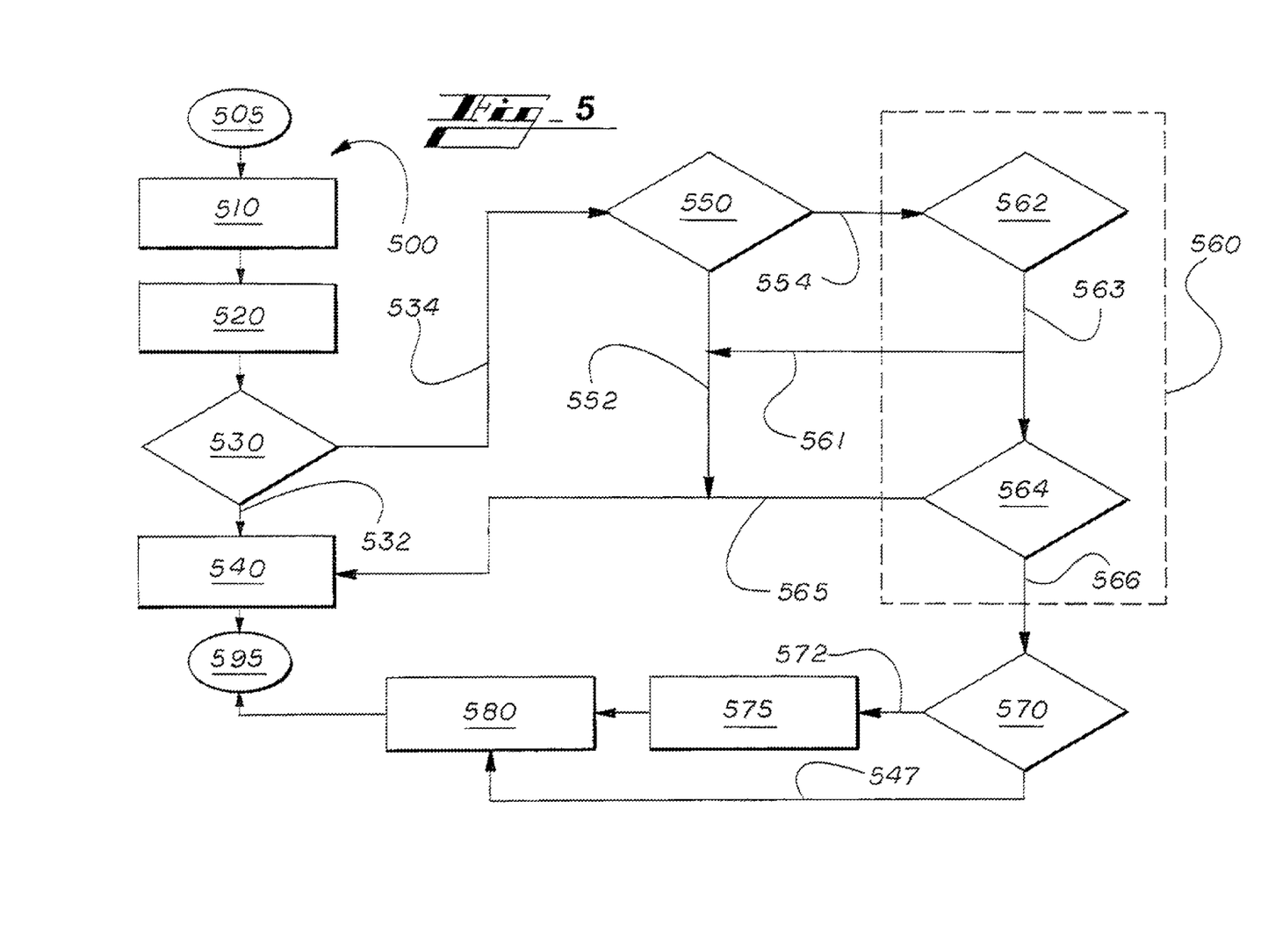
FIG. 5 is a flow chart illustrating certain methods associated with a lateral acceleration safety kernel process.

FIG. 5

FIG. 5 is a flow chart illustrating certain methods associated with the lateral acceleration safety kernel process, e.g. steering process 500. Lateral acceleration is the movement in a direction perpendicular to the direction of travel. Lateral acceleration can be altered through, among others, a differential braking, e.g., applying a right electrical brake to cause the vehicle to turn towards the right; a radial revolution dictated by the circumference of a steering wheel; environmental change, e.g., the gradient of the pavement changes causing the direction of motion to change. When the direction of lateral acceleration changes, a steering angle is formed by the heading of the initial direction and the heading of the new direction. This steering angle can be measured by sensors, stored internal or external to the safety kernel software, and recalled later during the steering process 500.

A steering controller responsible for lateral acceleration will cause steering while there is a stream of requests for lateral acceleration disseminated by the safety kernel from the ADS or the CMS to a set of steering actuators, or received by the controller from the operator inputs. If steering requests are not being received due to a failure in the steering controller, the controller, for example, will automatically cause the steering angle to return to zero, i.e., wheels aligned with longitudinal axis of the vehicle.

The steering process 500 commences by engaging the response mode at step 505, and the initial request for lateral acceleration is transmitted through the ADS and the CMS at step 510.

Next, the initial lateral acceleration request from the ADS and/or the CMS enters the safety kernel software at step 520 where the safety kernel software evaluates what action to take in response to the initial request received from the ADS and/or the CMS. To evaluate the action, the safety kernel software determines whether an operator override exists at step 530. When an override exists to control lateral acceleration, the ADS should generate a request for steering. When an override is detected (e.g., path 532), the safety kernel software will block the request at step 540, e.g., the safety kernel software will not forward or otherwise allow the request to pass to one or more steering actuators. When no override exists (e.g., path 534), the safety kernel software determines whether the initial steering request meets a set of primary safeguards at step 550. The primary safeguards at step 550 are similar to the primary safeguards as discussed in association with FIG. 2.

When the primary safeguards are not met at step 550 (e.g., path 552), the safety kernel software blocks the initial lateral acceleration request at step 540. When the initial lateral acceleration request is blocked at step 540, the vehicle continues with the parameters present prior to the initial lateral acceleration request. When no failures are detected at step 550 (e.g., path 554), the safety kernel software determines whether the initial request meets a set of secondary safeguards at step 560.

The secondary safeguards at step 560 include a series of confirmations, including a check for other blocked requests at step 562, and a check to compare the vehicle speed to a threshold speed at step 564. The execution of the secondary safeguard checks can be conducted in any order, and do not have to be conducted in a specific order. However, each secondary safeguard should be checked for each request by the safety kernel software.

The check for other blocked requests at step 562 allows the safety kernel software to identify possible flaws or errors with the ADS and/or the CMS software. When the ADS and the CMS transmit a multiple requests that have been blocked, the inconsistency may suggest a flaw or error is present within the ADS and/or CMS. The number of blocked requests which will trigger the safety kernel software to automatically block an existing request for lateral acceleration can be preset to any number that is reasonable and stored within the safety kernel software or other storage mediums. The separation of the safety kernel software from the application software allows the check for other blocked requests to be a secondary check for an existing code flaws or errors within the ADS and/or the CMS. As such, when the vehicle has experienced multiple blocked request at step 562 (e.g., path 561), then the safety kernel will block the initial lateral acceleration request at step 540. If multiple blocked requests are not discovered (e.g., path 563), the safety kernel software moves to the next secondary safeguard check.

The safety kernel software also compares the vehicle speed with the vehicle threshold speed at step 564, similar to the secondary safeguard at step 464 described above. Specifically, when the vehicle speed is less than the threshold speed at step 564 (e.g., path 565), the safety kernel will block the request at step 540.

If all secondary safeguards at step 560 are met (e.g., path 566), the safety kernel software will determine whether the initial request needs to be limited to a modified level of lateral acceleration at step 570. A request is for lateral acceleration is compared against a preset Unintended Vehicle Lateral Motion Metric (UVLAM). When the initial request for lateral acceleration is greater than the UVLAM (e.g., path 572), then the safety kernel software limits the lateral acceleration to the modified level of lateral acceleration at step 575. The modified level of lateral acceleration will be a value at or near the UVLAM. When the initial request for lateral acceleration is less than the UVLAM (e.g., path 574), the safety kernel passes the initial lateral acceleration request to the steering actuator at step 580.

Either the passing of a lateral acceleration request to the steering actuator at step 580 or the blocking of an initial request at step 540 concludes the acceleration process 500 at step 595.

III. BENEFITS AND ADVANTAGES

Many of the benefits and advantages of the present technology are described herein above. The present section presents in summary some of the benefits of the present technology.

The technology allows the safety kernel software to be independent from the application software. This separation keeps the safety kernel software from being affected when the application software generates a request that violates one or more safety rules. The safety kernel software conducts secondary safeguard checks to prevent a request from based on a flaw or error in the application software from being implemented.

The technology can also be used as independent control/mitigation to meet some of the requirements of the International Organization for Standardization (ISO), specifically ISO 26262. ISO 26262 is a functional safety standard intended to be applied to the development of programming for electrical and/or electronic systems in automobiles, and is aimed at reducing risks associated with software for safety functions to a tolerable level by providing feasible requirements and processes.

The technology may also serves as evidence for a safety case. When the integrity of the vehicle an autonomous function is called into question, the safety kernel software may be used to show the vehicle has met the origin of the safety requirements. These safety requirements include pre-defined certification requirements for showing that the vehicle has been approved against regulations.

The safety requirements also include the hazard analysis and risk assessment process, which specify targets and means for preventing or mitigating the identified hazards. The use of the safety kernel software to verify the safety requirements provides an efficient manner to accomplish stated goals as compared to debating compliance of individual components within the system.

IV. CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A safety kernel system, for use in connection with motion control of a vehicle, comprising:
   a processor configured and arranged for communication with a measurement system including a vehicle-system actuator and a sensor; and
   a non-transitory computer-readable storage device comprising computer-executable instructions including a safety kernel software and a set of safety rules, wherein the instructions, when executed by the processor, cause the processor to perform operations comprising:
   receiving, from distinct software being separate and independent of the safety kernel software, a request for a safety-critical function related to vehicle motion;
   receiving, from the measurement system including the vehicle-system actuator and the sensor, using the safety kernel software, an actions signal containing an actions data set;
   applying, using the safety kernel software, the set of safety rules to the actions data set, rendering a safety-kernel software response;
   comparing the request for the safety-critical function to the safety-kernel software response rendered;
   limiting, based on results of the comparing operation, the request for the safety-critical function, rendering a limited request, if the request for the safety-critical function is beyond a threshold parameter set by the safety kernel software; and
   transmitting, by way of a status signal, the limited request for the safety-critical function to the vehicle-system actuator.

2. The system of claim 1, wherein the distinct software includes an application software package.

3. A method, for use in connection with motion control of a vehicle, comprising:
   receiving, by a system having a processor configured and arranged for communication with a measurement system including a vehicle-system actuator and a sensor, from an application software package, using a safety kernel software package of the system, a request for a safety-critical function related to vehicle motion;
   receiving, by the system, from a measurement system including a vehicle-system actuator and a sensor, using the safety kernel software package, an actions signal containing an actions data set;
   determining, by the system executing the safety kernel software package, whether an override command has been received;
   detecting, by the system executing the safety kernel software package, whether there is a primary violation within a set of primary safeguards of the safety kernel software package;
   detecting, by the system executing the safety kernel software package, whether there is a secondary violation within a set of secondary safeguards of the safety kernel software package;
   limiting, by the system executing the safety kernel software package, the request for the safety-critical function, rendering a limited request, if the request is beyond a threshold parameter set by the safety kernel software package; and
   transmitting, by way of a status signal, the limited request for the safety-critical function to the vehicle-system actuator.

4. The method of claim 3, wherein the primary safeguards prescribe a process comprising:

detecting any failure within the vehicle-system actuator and the sensor; and verifying that the initial request was transmitted by the application software package.

5. The method of claim 4, further comprising blocking, by the system, the request received by the safety kernel software package in response to the safety kernel software package (a) detecting failure within the vehicle-system actuator and the sensor or (b) determining that the initial request was not transmitted by the application software package.

6. The method of claim 3, wherein the secondary safeguards prescribe a deceleration routine comprising:

evaluating, if the vehicle has experienced an increase in acceleration based on a command state, the increase in acceleration as captured by the vehicle-system actuator and the sensor;

determining, by comparing the request for the safety-critical function to a deceleration request threshold, whether the request for the safety-critical function includes a hard brake; and evaluating, if the vehicle is in a vicinity of a threat, the threat including analyzing a distance between the threat and the vehicle.

7. The method of claim 6, further comprising:

determining, by the system, based on the command state, whether the vehicle has experienced an increase in acceleration; and blocking, if the vehicle has experienced an increase in acceleration, the request for deceleration from being passed to the vehicle-system actuator being a braking actuator.

8. The method of claim 6, further comprising blocking, by the system, the request for deceleration, when the request includes a hard brake.

9. The method of claim 6, further comprising blocking, by the system, the request for deceleration when the vehicle speed is in the vicinity of the threat.

10. The method of claim 6, further comprising:

adjusting, by the system, when the application software has generated a hard brake request, the request for deceleration to a modified level of deceleration; and transmitting the modified level of deceleration to the vehicle-system actuator being a braking actuator.

11. The method of claim 6, further comprising:

adjusting, by the system, when the vehicle is in the vicinity of the threat, the request for deceleration to the modified level of deceleration; and transmitting the modified level of deceleration to the vehicle-system actuator being a braking actuator.

12. The method of claim 3, wherein the secondary safeguards prescribe an acceleration routine comprising:

evaluating, if the vehicle has experienced a deceleration request based on a command state, the deceleration captured by the sensor and the vehicle-system actuator; and comparing the vehicle speed to a threshold speed.

13. The method of claim 12, further comprising:

determining, by the system, whether the vehicle has experienced a brake request; and blocking, if the vehicle has experienced a brake request, the request for acceleration from being passed to the vehicle-system actuator being a propulsion actuator.

14. The method of claim 12, further comprising blocking, by the system, the request for acceleration, when the vehicle speed is less than the threshold speed, from being passed to the vehicle-system actuator being a propulsion actuator.

15. The method of claim 12, further comprising:

adjusting, by the system, when the vehicle speed is greater than the threshold speed, the request for acceleration to a modified level of acceleration; and transmitting the modified level of acceleration to the vehicle-system actuator being a propulsion actuator.

16. The method of claim 3, wherein the secondary safeguards prescribe an lateral acceleration routine comprising:

evaluating, if the vehicle has experienced at least one other blocked request based on a command state, and comparing the vehicle speed to a threshold speed.

17. The method of claim 16, further comprising:

determining, by the system, whether the vehicle has experienced at least one other blocked request; and blocking, if the vehicle has experienced at least one other blocked request, the request for lateral acceleration from being passed to the vehicle-system actuator being a steering actuator.

18. The method of claim 16, further comprising blocking, by the system, the request for lateral acceleration, when the vehicle speed is less than the threshold speed, from being passed to the vehicle-system actuator being a steering actuator.

19. The method of claim 16, further comprising:

adjusting, by the system, when the vehicle speed is greater than the threshold speed, the request for lateral acceleration to a modified level of lateral acceleration; and transmitting the modified level of lateral acceleration to the vehicle-system actuator being a steering actuator.

20. A method, for use in connection with motion control of a vehicle, comprising:

receiving, by a system having a processor configured and arranged for communication with a measurement system including a vehicle-system actuator and a sensor, a request for a safety-critical function to a safety kernel software package, the request originating from an application software package;

receiving, by the system, from the measurement system including the vehicle-system actuator and the sensor, using the safety kernel software package, an actions signal containing an actions data set;

determining, by the system, executing the safety kernel software package, whether an override command has been received;

detecting, by the system executing the safety kernel software package, whether there is a violation within a set of primary safeguards of the safety kernel software package;

blocking, when there is a violation within the set of primary safeguards of the safety kernel software package, the request from being passed to an actuator;

detecting, by the system executing the safety kernel software package, whether there is a violation within a set of secondary safeguards of the safety kernel software package;

blocking, when there is a violation within the set of secondary safeguards of the safety kernel software package, the request from being passed to the actuator;

limiting, by the system executing the safety kernel software package, the request for the safety-critical function, rendering a limited request, if the request is beyond a threshold parameter set by the safety kernel software package; and transmitting, by the system executing the safety kernel software package, to the vehicle-system actuator, the limited request.

* * * * *